UNITED STATES PATENT OFFICE 2,292,921

INSOLUBILIZING POLYHYDROXY SIZES WITH ALDEHYDO QUATERNARY AMMONIUM COMPOUNDS

Louis H. Bock, Glenside, and Alva L. Houk, Philadelphia, Pa., assignors to Rohm & Haas Company, Philadelphia, Pa.

No Drawing. Application July 31, 1940, Serial No. 348,828

12 Claims. (Cl. 117—161)

This invention relates to a method for rendering insoluble certain high molecular weight compounds having a multiplicity of hydroxyl groups. In particular this invention deals with a method of insolubilizing polymeric hydroxyl-containing sizes, such as polyvinyl alcohol, starch and its derivatives, and water-soluble forms of cellulose ethers by reaction with aldehydo quaternary ammonium salts, which are described in our copending application Serial No. 350,134 filed August 2, 1940.

We have described in application Serial No. 309,398, filed December 15, 1939, now Patent No. 2,267,277, granted December 23, 1941, a method for rendering polysaccharides water-resistant by treatment with an acid salt of an aminomethyl aldehyde. We have now found that related aldehydo quaternary ammonium salts are even more effective and efficient in insolubilizing polyhydroxy sizing materials.

These aldehydo quaternary ammonium salts are compounds of the formula

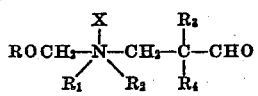

wherein R represents a member of the class consisting of aliphatic, arylaliphatic, and hydroarylaliphatic groups having at least one hydrogen atom on the carbon atom attached to the ether oxygen atom, $R_1$ and $R_2$ are members of the class consisting of aliphatic groups and cycloaliphatic hydrocarbon groups when taken singly and, when taken together, divalent saturated aliphatic radicals which jointly with the nitrogen atom form a heterocycle, $R_3$ is a member of the group consisting of hydrogen and alkyl groups, $R_4$ is a member of the class consisting of hydrogen and aliphatic hydrocarbon groups and X is a halogen. Polyhydroxy, water-soluble sizes react with these aldehydo quaternary ammonium compounds at moderately elevated temperatures to yield relatively insoluble complexes.

The reaction can be conveniently used to produce a wash-fast size on textiles by adding the aldehydo quaternary compound to the sizing bath and, after applying the size to the textile, heating to cause the reaction. The quaternary compound may also be applied to sized fabric from a separate bath. When desired, sizing and an aldehydo quaternary ammonium compound may be mixed and the preparation distributed in commerce in this ready-to-use form. For some uses, as in the beater sizing of paper, the sizing may be partially toughened by causing a partial reaction to take place and applied in this form. Also, the effectiveness of the quaternary compounds in insolubilizing polyhydroxy compounds permits the formation of films from various soluble polyhydroxy materials and the insolubilizing of these films by heating them therewith. These films may be used for covering paper, cardboard, cloth, etc.

The sizes which are useful in this invention are hydroxyl-containing, water-soluble materials. The term "water-soluble" is used here to designate both molecular solubility and colloidal solubility. These materials include the water-soluble cellulose ethers, such as water-soluble methyl cellulose, ethyl cellulose, hydroxyethyl cellulose, etc., polyvinyl alcohol, and starch in its various forms. The starch may be corn, rice, tapioca, sago, wheat, potato, etc. starch or flours containing a high percentage of starch and may be treated or modified, as is the custom for sizes, by acid or enzyme conversion, oxidation, heat treatment, etc. Also useful as starch sizes are the soluble starch ethers such as ethyl starch or benzyl ethyl starch.

The aldehydo quaternary ammonium halides are obtained by reacting a halomethyl ether of the formula $ROCH_2X$ with an aminomethyl aldehyde of the formula

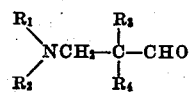

wherein the symbols have the same significance as above. The aminomethyl aldehyde is obtainable in turn by condensing a secondary amine, formaldehyde, and an aldehyde having at least one hydrogen atom on the α-carbon atom. Typical of the groups useful as R there may be taken any primary or secondary aliphatic type group, such as methyl, ethyl, allyl, isopropyl, methallyl, butyl, sec-butyl, amyl, sec-amyl, capryl, octyl, decyl, undecenyl, dodecyl, cetyl, 9,10-octadecenyl, benzyl, hexahydrobenzyl, cyclohexyl, phenoxyethyl, terbutylphenoxyethyl, etc. The groups $R_1$ and $R_2$ may be alike or different and are obtainable from any strongly basic, non-aromatic secondary amine. These groups may be such as methyl, ethyl, hydroxyethyl, propyl, allyl, butyl, capryl, octyl, dodecyl, cyclohexyl, etc. When $R_1$ and $R_2$ together form a divalent aliphatic group, the secondary amine is heterocyclic as in morpholine, pyrrol, piperidine etc. The group $R_3$ may be hydrogen or an alkyl group, such as methyl, ethyl, propyl, isopropyl, etc. The group $R_4$ may also be hydrogen or an aliphatic hydrocarbon group. $R_3$ and $R_4$ result from the aldehydes such as acetaldehyde, propionaldehyde, isobutyraldehyde, valeraldehyde, dodecaldehyde, 9,10-octadecenaldehyde, octadecaldehyde, etc.

Typical of the aldehydo quaternary ammonium halides which may be prepared are the following:

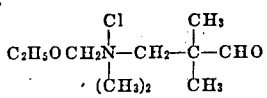

Ethoxymethyl dimethyl β-methyl-β-formyl-propyl ammonium chloride

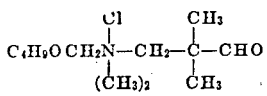

Butoxymethyl dimethyl β-methyl-β-formyl-propyl ammonium chloride

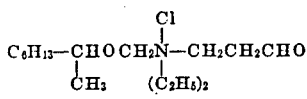

Capryloxymethyl β-formyl-ethyl diethyl ammonium chloride

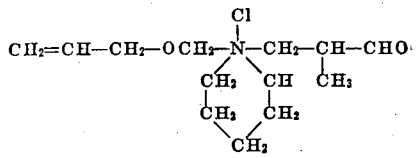

Allyloxymethyl β-formyl-propyl piperidinium chloride

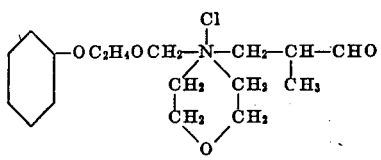

Phenoxyethoxymethyl β-formyl-propyl morpholinium chloride

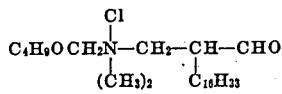

Butoxymethyl dimethyl β-formyl-octadecyl ammonium chloride

In insolubilizing a polyphydroxy, water-soluble size according to this invention the size is treated with an aldehydo quaternary ammonium salt directly or in conjunction with cloth or other textile material. The size carrying the sale is then dried in a separate step or in the step of heating. Heating above about 90° C. is necessary to effect the reaction between size and quaternary salt. When the size is on yarn or fabric, drying and heating are accomplished while the yarn or fabric is passed over heated rolls or through a hot oven, such as a closed tenter, loop-drier, or the like.

The process of insolubilizing sizes may be applied to the sizing of fabrics, braids, yarn, thread, fibers, felts, or sheets of any material which may be wet-treated and heated to 100° C. or higher without undue damage thereto. The process is particularly important in the sizing of textile materials such as cotton, linen, paper, straw, jute, hemp, and synthetic fibers.

The following examples are illustrative of the fixation of hydroxyl-containing sizes.

*Example 1*

A paste containing 8% of a partially converted corn starch was prepared and five parts of the paste mixed with one part of a 50% aqueous solution of dodecyloxymethyl dimethyl β-methyl-β-formyl-propyl ammonium chloride. This mixture was applied to cotton sheeting and excess starch removed with a doctor blade. The impregnated sheeting was then dried, heated in an oven at 130° C. for one-half hour, and washed in a solution of soap and soda. The cloth had a bulky, full finish which was not altered on further washing.

*Example 2*

A size bath was prepared with 10 parts of the 8% starch paste from Example 1 and 1 part of butoxymethyl dimethyl β-methyl-β-formyl propyl ammonium chloride. This composition was spread over cotton sheeting and excess removed with a doctor blade. The cloth was dried at room temperature and then heated for one-half hour in an oven at 130° C. A moderately stiff finish resulted which was relatively fast to washing.

*Example 3*

A 4% aqueous solution of a water-soluble methyl cellulose was prepared. To five parts of this solution there was added one part of a 50% aqueous solution of decyloxymethyl dimethyl β-methyl-β-formyl-propyl ammonium chloride. This solution was spread on cotton sheeting and excess solution removed with a doctor blade. The cloth was then put in an oven, dried, and heated for one-half hour at 130° C. While the net increase in weight of this fabric after laundering was only 7½%, a firm, full finish was obtained which was highly resistant to laundering.

*Example 4*

An 8% paste of converted corn starch was prepared and 10 parts of this paste mixed with one part of 2-ethylhexoxy-methyl dimethyl β-methyl-β-formyl-propyl ammonium bromide to form a size. The size was applied to cotton sheeting, excess scraped off, and the cloth dried. It was heated at 100° C. for one-half hour. After laundering, the increase in weight of the cloth was 19.5%. A very stiff finish was obtained.

*Example 5*

A paste was prepared from 20 parts of a 7½% aqueous solution of hydroxyethyl cellulose and one part of a 50% solution of the benzyloxymethyl β-formyl-butyl dimethyl ammonium chloride. The paste was spread on sheeting, excess paste scraped off, and the treated cloth dried. It was heated in an oven at 130° C. for one-half hour. The resulting fabric was stiff and full after washing.

*Example 6*

A paste was made of 8% tapioca starch which was partially converted with diastatic enzymes. To 20 parts of the paste was added one part of the 2-ethylhexoxymethyl β-ethyl-β-formyl-hexyl dimethyl ammonium chloride. This paste was applied to cotton sheeting, the excess removed by scraping and the treated cloth dried. It was then baked for forty minutes at 120° C. The resulting finish was firm and somewhat stiff and fast to washing.

*Example 7*

An 8% paste of potato starch was prepared and five parts thereof mixed with one part of ethoxymethyl dimethyl β-methyl-β-formyl-propyl ammonium chloride. This sizing was applied to sheeting, which was then dried, heated at 130° C.

for one-half hour, and washed. The resulting fabric was quite stiff.

*Example 8*

Linen cloth was impregnated with a paste made from 10 parts of a 7½% solution of hydroxyethyl cellulose and one part of the dodecyloxymethyl dimethyl β-methyl-β-formyl-propyl ammonium chloride. Excess paste was removed with squeeze rolls. The cloth was dried and heated in an oven at 130° C. for one-half hour. A very stiff permanent finish was produced.

*Example 9*

A spun rayon-cotton fabric was padded through a solution containing one-half per cent. of polyvinyl alcohol and two per cent. of the butoxymethyl β-formyl-dodecyl dimethyl ammonium chloride. The fabric was dried and heated in an oven at 120° C. for forty minutes. The resulting fabric had a firm, full hand which was well-retained on washing.

We claim:

1. A process for insolubilizing a water-soluble, hydroxyl-containing sizing selected from the class consisting of starch sizes, polyvinyl alcohol, and cellulose ethers, which comprises treating and heating said sizing with a compound of the formula

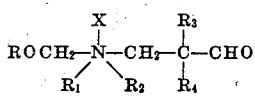

wherein R represents a member of the class consisting of aliphatic, arylaliphatic, and hydroarylaliphatic groups having at least one hydrogen atom on the carbon atom attached to the ether oxygen atom, $R_1$ and $R_2$ are members of the class consisting of aliphatic groups and cycloaliphatic hydrocarbon groups when taken singly and when taken together divalent saturated aliphatic radicals which jointly with the nitrogen atom form a heterocycle, $R_3$ is a member of the group consisting of hydrogen and alkyl groups, $R_4$ is a member of the class consisting of hydrogen and alipahtic hydrocarbon groups and X is a halogen.

2. A process for rendering the sizing of a textile material wash-fast which comprises treating said textile material with an aqueous solution containing a water-soluble, hydroxyl-containing size selected from the class consisting of starch sizes, polyvinyl alcohol, and cellulose ethers and a compound of the formula

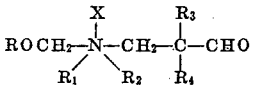

wherein R represents a member of the class consisting of aliphatic, arylaliphatic, and hydroarylaliphatic groups having at least one hydrogen atom on the carbon atom attached to the ether oxygen atom, $R_1$ and $R_2$ are members of the class consisting of aliphatic groups and cycloaliphatic hydrocarbon groups when taken singly and when taken together divalent saturated aliphatic radicals which jointly with the nitrogen atom form a heterocycle, $R_3$ is a member of the group consisting of hydrogen and alkyl groups, $R_4$ is a member of the class consisting of hydrogen and aliphatic hydrocarbon groups and X is a halogen, and heating the thus treated textile material above 100° C.

3. A process for rendering the sizing of a textile material wash-fast which comprises treating said material with an aqueous bath containing starch sizing and a compound of the formula

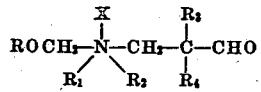

wherein R represents a member of the class consisting of aliphatic, arylaliphatic, and hydroarylaliphatic groups having at least one hydrogen atom on the carbon atom attached to the ether oxygen atom, $R_1$ and $R_2$ are members of the class consisting of aliphatic groups and cycloaliphatic hydrocarbon groups when taken singly and when taken together divalent saturated aliphatic radicals which jointly with the nitrogen atom form a heterocycle, $R_3$ is a member of the group consisting of hydrogen and alkyl groups, $R_4$ is a member of the class consisting of hydrogen and aliphatic hydrocarbon groups and X is a halogen, and heating the treated material above 100° C.

4. A process for rendering the sizing of a textile material wash-fast which comprises treating said material with an aqueous bath containing a water-soluble cellulose ether and a compound of the formula

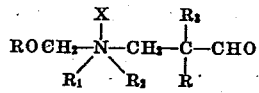

wherein R represents a member of the class consisting of aliphatic, arylaliphatic, and hydroarylaliphatic groups having at least one hydrogen atom on the carbon atom attached to the ether oxygen atom, $R_1$ and $R_2$ are members of the class consisting of aliphatic groups and cycloaliphatic hydrocarbon groups when taken singly and when taken together divalent saturated aliphatic radicals which jointly with the nitrogen atom form a heterocycle, $R_3$ is a member of the group consisting of hydrogen and alkyl groups, $R_4$ is a member of the class consisting of hydrogen and aliphatic hydrocarbon groups and X is a halogen, and heating the treated material above 100° C.

5. A process for rendering the sizing of textile material wash-fast which comprises treating said material with an aqueous bath containing polyvinyl alcohol and a compound of the formula

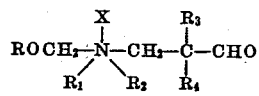

wherein R represents a member of the class consisting of aliphatic, arylaliphatic, and hydroarylaliphatic groups having at least one hydrogen atom on the carbon atom attached to the ether oxygen atom, $R_1$ and $R_2$ are members of the class consisting of aliphatic groups and cycloaliphatic hydrocarbon groups when taken singly and when taken together divalent saturated aliphatic radicals which jointly with the nitrogen atom form a heterocycle, $R_3$ is a member of the group consisting of hydrogen and alkyl groups, $R_4$ is a member of the class consisting of hydrogen and aliphatic hydrocarbon groups and X is a halogen, and heating the treated material above 100° C.

6. The process of claim 4 in which the water-soluble cellulose ether is a water-soluble methyl cellulose.

7. A process for rendering the sizing of a textile material wash-fast which comprises treating said material with an aqueous bath containing a starch sizing and butoxymethyl dimethyl β-formyl-β-methyl-propyl ammonium chloride and heating the treated material above 100° C.

8. Textile material carrying a complex reaction product of a water-soluble, hydroxyl-containing size selected from the class consisting of starch sizes, polyvinyl alcohol, and cellulose ethers and a compound of the formula

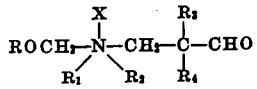

wherein R represents a member of the class consisting of aliphatic, arylaliphatic, and hydroarylaliphatic groups having at least one hydrogen atom on the carbon atom attached to the ether oxygen atom, $R_1$ and $R_2$ are members of the class consisting of aliphatic groups and cycloaliphatic hydrocarbon groups when taken singly and when taken together divalent saturated aliphatic radicals which jointly with the nitrogen atom form a heterocycle, $R_3$ is a member of the group consisting of hydrogen and alkyl groups, $R_4$ is a member of the class consisting of hydrogen and aliphatic hydrocarbon groups and X is a halogen.

9. The textile material of claim 8 in which the size is a starch sizing.

10. The textile material of claim 8 in which the size is a water-soluble cellulose ether.

11. The textile material of claim 8 in which the size is polyvinyl alcohol.

12. Textile fabric carrying the complex reaction product of a starch size and a compound of the formula

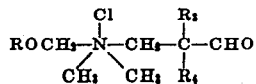

wherein R is an aliphatic hydrocarbon group having at least one hydrogen atom on the carbon atom attached to the ether oxygen atom, $R_3$ is a member of the class consisting of hydrogen and alkyl groups, and $R_4$ is a member of the class consisting of hydrogen and aliphatic hydrocarbon groups.

LOUIS H. BOCK.
ALVA L. HOUK.